Sept. 20, 1971 E. PRETE, JR 3,605,637
ANCHOR FITTING FOR SECURING LOADS TO A RETAINER TRACK
Filed Sept. 2, 1970 2 Sheets-Sheet 2

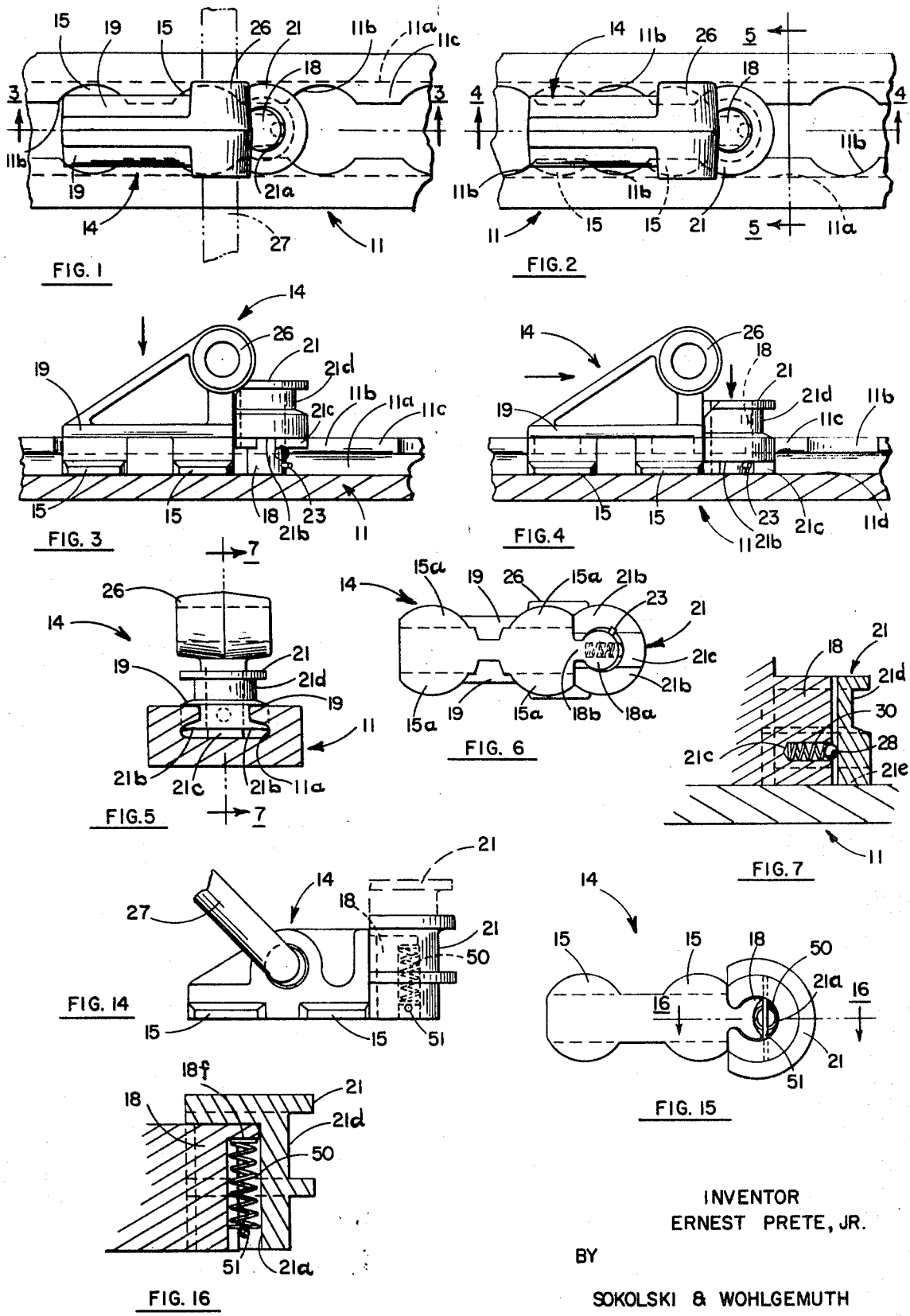

INVENTOR
ERNEST PRETE, JR.
BY
SOKOLSKI & WOHLGEMUTH
ATTORNEYS

United States Patent Office 3,605,637
Patented Sept. 20, 1971

3,605,637
ANCHOR FITTING FOR SECURING LOADS TO A RETAINER TRACK
Ernest Prete, Jr., Woodland Hills, Calif., assignor to Ancra Corporation, El Segundo, Calif.
Filed Sept. 2, 1970, Ser. No. 68,942
Int. Cl. B61d *45/00;* B60p *7/08*
U.S. Cl. 105—369A
12 Claims

ABSTRACT OF THE DISCLOSURE

An anchor fitting has a body portion with flat surfaced pad means with shoulders extending therefrom, and a post portion extending along an axis substantially normal to the flat surfaces of the pad means. A latching plunger member is slidably mounted on the post portion for motion along the longitudinal axis thereof. The anchor fitting is removably retained in a selected position along a slotted track having a plurality of notched portions separated by narrow neck portions; with the shoulders of the pad means in the track slots underneath the neck portions and with the latching plunger member seated in one of the notched portions thereof.

---

This invention relates to an anchoring device, and more particularly to such a device suitable for removably securing a load to a track member at a pre-selected position therealong.

In vehicles such as aircraft, it is necessary to provide means for selectively anchoring various types of loads such as cargo, passenger seats, and the like, in various positions along the floor of the aircraft. Such anchoring must be secure and reliable to assure that these loads do not become loose during travel, which could pose a hazard to passengers and personnel and in the case of cargo, damage thereto. At the same time, it is necessary that it be relatively easy to attach and detach the anchoring means from any selected position in the vehicle, so as to permit versatility in loading and conversion from one type of load to another, as for example converting between passenger and cargo handling capabilities.

To solve this problem, a particular type of track structure has come into general use, this track structure comprising an elongated track member having spaced notches formed therein separated by flange portions, a slot being formed along the track for receiving an anchor fitting. Various types of anchor fittings have been developed to fit in this type of track, these utilizing securing mechanisms of one type or another.

The device of this invention is an anchor fitting suitable for utilization with the aforementioned type of track which is an improvement over prior art anchoring devices. The device of this invention is of relatively simple and economical construction, yet at the same time affords high strength and excellent holding capabilities. Further, the device of this invention can be very easily engaged and disengaged from the track, even where in locations of minimum access, which is particularly significant where dealing with the attachment of passenger seats with little finger room available for actuating the securing and release mechanism. The device of the invention still further is capable of providing reliable holding action requiring positive action for release, such that inadvertent release of the securing mechanism is highly unlikely.

It is therefore the principal object of this invention to provide an economical yet highly reliable and easy to operate anchor fitting for securing loads to a vehicle.

Figure 8:
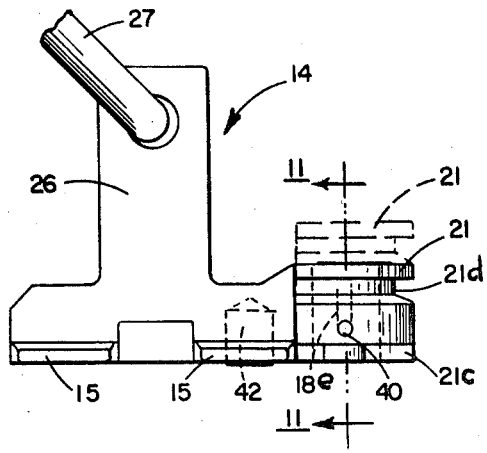
Figure 9:
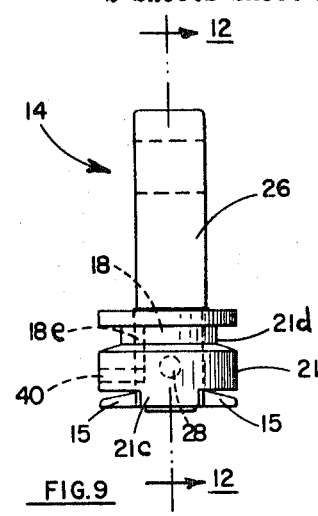
Figure 10:
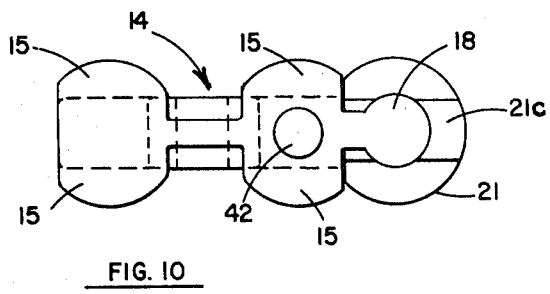
Figure 11:
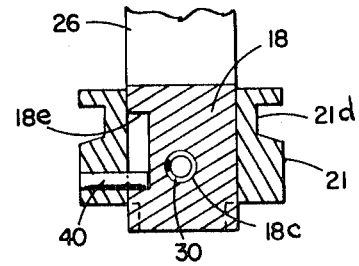
Figure 12:
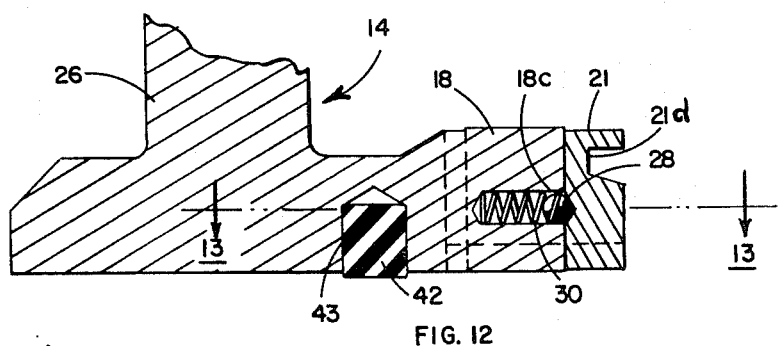
Figure 13:
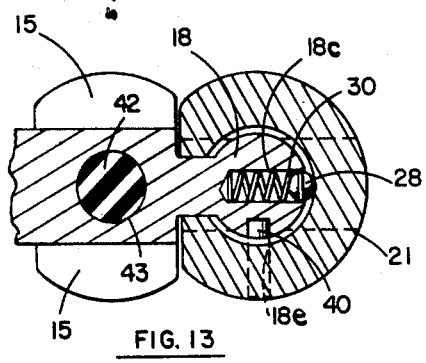

Other objects of this invention will become apparent from the following description taken in connection with the accompanying drawings, of which:

FIG. 1 is a top plan view of a first embodiment of the device of the invention shown as it is being installed in a track, FIG. 2 is a top plan view of the first embodiment shown in its fully installed position, FIG. 3 is a cross sectional view taken along the plane indicated by 3—3 in FIG. 1, FIG. 4 is a cross sectional view taken along the plane indicated by 4—4 in FIG. 2, FIG. 5 is a cross sectional view taken along the plane indicated by 5—5 in FIG. 2, FIG. 6 is a bottom plan view of the first embodiment of the device of the invention, FIG. 7 is a cross sectional view taken along the plane indicated by 7—7 in FIG. 5, FIG. 8 is a side elevational view of a second embodiment of the device of the invention, FIG. 9 is an end elevational view of the second embodiment, FIG. 10 is a bottom plan view of the second embodiment, FIG. 11 is a cross sectional view taken along the plane indicated by 11—11 in FIG. 8, FIG. 12 is a cross sectional view taken along the plane indicated by 12—12 in FIG. 9, FIG. 13 is a cross sectional view taken along the plane indicated by 13—13 in FIG. 12, FIG. 14 is a side elevational view of a third embodiment of the device of the invention, FIG. 15 is a bottom plan view of the third embodiment, and FIG. 16 is a cross sectional view taken along the plane indicated by 16—16 in FIG. 15.

Briefly described, the device of the invention includes a main body portion having a pair of flat surfaced shouldered pads which are adapted to slide into a groove formed in a track to which the anchor fitting is to be secured. The main body portion also includes a vertical post portion located at one extremity thereof which extends in a direction substantially normal to the broad surfaces of the pads. Slidably mounted on the post portion for motion along the longitudinal axis thereof is a latching plunger member. The track has a plurality of notches formed therein, the base portion of the plunger fitting into these notches when the plunger is in its downward position. when seated in the notches, the plunger member acts to prevent motion of the anchor assembly along the track, the anchor fitting pad portions being positioned in the track under flanges between the notches, thereby retaining the anchor fitting in the track. In one embodiment, the plunger is spring-urged to the downward position for retention in the track, while in other embodiments, stop means are provided to define raised and lowered positions for the plunger.

Referring now to FIGS. 1–7, a first embodiment of the device of the invention is illustrated. Track member 11 is in the form of an elongated strip which is usually fixedly attached to the floor of the vehicle. Track 11 has a T-shaped slot 11a formed therein, this slot running along the entire longitudinal extent of the track. The track also includes notched portions 11b spaced therealong, these notched portions being separated from each other by flange portions 11c.

The anchor fitting includes a main body 14 which has a pair of spaced base pads 15 along the bottom portion thereof. Pads 15 have flat surfaces 15a which form support surfaces for the unit. At one extremity of the main body and extending vertically, i.e., with its longitudinal axis normal to surfaces 15a, is post portion 18 which has a bottom flat surface 18a located in the same plane as surfaces 15a. Post portion 18 is generally circular and has a neck 18b which joins to the main part of body 14. The main body has ledge portions 19, these ledge portions and pads 15 forming a slot into which the flange portions 11c of the track fit.

Slidably supported on post portion 18 for movement along the longitudinal axis thereof is latching plunger member 21. Plunger 21 may be in the form of a truncated cylinder and has a hollow center defined by inner circularly shaped wall portion 21a which wraps around the outer wall of post 18. The plunger member is thus held on the post portion for slidable movement along the longitudinal axis thereof. Pin 23 is fixedly attached to post portion 18 and protrudes therefrom. Pin 23 operates to arrest the downward motion of plunger 21, this pin abutting against undercut surfaces 21b. Plunger member 21 has a groove 21d formed therein to facilitate manual manipulation thereof. It is to be noted that the inner wall of the plunger and outer wall of the post need not be cylindrical and could have some other suitable cross section such as oblong, triangular, etc.

Main body 14 also includes a hollow cylindrical top portion 26 also serves to arrest the upward travel of plung- attached to the member to be secured. The bottom edge of portion 26 also serves to arrest the upward travel of plunger 21. Plunger 21 is held in a selected position on post 18 by means of ball member 28, which is retained in slot 18c formed in post 18, the ball being urged against the inner surface of the latching member by means of spring 30.

In positioning the anchor assembly in track 11, latching member 21 is first placed in its extreme upper position with its top surface abutting against attachment portion 16, as shown in FIGS. 1 and 3. The anchor member is then placed in slot 11a, of the track in the desired position with pads 15 underneath selected flanges 11c and ledge portions 19 resting on top of the flanges. Plunger 21 is then pressed downward into the oppositely positioned notch 11b with central portions 21c and 21d thereof bottomed against the inner wall 11d of the track, and with pin 23 abutting against undercut portion 21b thereof as shown in FIGS. 2 and 4. In the secured position of FIGS. 2 and 4, plunger 21 is prevented from moving horizontally along the track by the walls of the notch, while the main body of the anchor is prevented from moving vertically by flanges 11c which overlap the pad portions 15. It also should be apparent that the anchor fitting can readily be removed merely by raising plunger 21 upwardly to the position indicated in FIGS. 1 and 3, in which position the anchor assembly can be moved horizontally to a position at which pads 15 are in a pair of notches from where they can be removed from the track.

Referring now to FIGS. 8–13, a second embodiment of the device of the invention is illustrated. As the second embodiment joins with the track member in the same general fashion as described in connection with the first, the track is not again shown. The same numerals are utilized to identify like portions of both embodiments. This second embodiment differs from the first in that the attachment member 26 extends substantially vertically upwardly from the base of main body portion 14 and thus is positioned away from plunger 21 so that it cannot act to arrest the upward travel thereof. Therefore, other means for achieving this end result are utilized in the form of pin member 40 which protrudes from plunger 21 and rides in slot 18e formed in post 18. As for the first embodiment, holding tension is provided between plunger 21 and post 18 by means of ball 28 which is retained in slot 18c formed in the post and resiliently urged against the inner wall of plunger 21 by means of spring 30. The extreme upper and lower positions of the plunger are defined by means of pin 40 which is attached to the plunger and which rides in groove 18e formed in post 18, pin 40 abutting against the top wall of the groove in its fully raised position, and against the bottom wall of the groove, as illustrated in FIG. 11, in the fully lowered position. As for the first embodiment, a finger groove 21d is provided to facilitate manual operation of the plunger. Otherwise, the plunger 21 and the pad portions 15 are utilized in the same manner as described for the first embodiment in attaching the anchor assembly to a preselected portion of the track member. Rubber grommet 42 is force fitted into aperture 43 formed in the bottom of main body 14, to provide a cushion against vibrational chatter of the part. This second embodiment thus operates similarly to the first, except for the means utilized to establish the extreme limits of travel of the plunger.

Referring now to FIGS. 14–16, a third embodiment of the device of the invention is illustrated. Again, this third embodiment joins to a track member in the same general fashion as the first two and therefore will not be described in connection with the track member with which it operates. As for the first two embodiments, this embodiment has a pair of pad portions 15 which extend from main body 14 and which are held under the flange portions of the track in the locked position. The third embodiment also includes a plunger member 21 which rides vertically on a post portion 18 located at one extremity of the main body portion 14. This embodiment differs from the other two in that plunger 21 is continually urged downwardly by means of spring 50. Spring 50 is retained in the hollowed-out central portion 21a of plunger 21 between ledge 18f formed in the top of post portion 18 and pin 51 which is retained in plunger 21 across the bottom portion thereof. In positioning the anchor assembly in the track, plunger 21 is manually drawn upwardly against the tension of spring 50. When the assembly is in the position at which it is to be seated, the plunger can be released whereupon the spring drives it into the selected notch. The assembly can also readily be snapped into position by first placing pads 15 into a pair of notches adjacent the notch into which the plunger is positioned. By then placing downward pressure on the main body of the assembly so as to bottom the pads in the track, the bottom of the plunger will be abutted against a pair of track flanges and thus will be driven upwardly against the spring tension. The assembly is then pushed horizontally until the plunger is above the desired notch where it will snap into position in this notch.

The devices of this invention thus provide a simple and reliable mechanism for securing an anchor assembly to a track which is of economical fabrication. The device, while providing excellent holding action, can be easily attached to and detached from the track at a desired position therealong.

I claim:

1. In an anchor assembly for attachment to a track member having a longitudinal slot and spaced notch portions separated by flange portions formed therein, said anchor assembly comprising:

a main body having a pair of flat surfaced pads lying in a plane defined the bottom portion thereof, a post portion located at an extremity of said main body and extending upwardly from the aforementioned plane, the longitudinal axis of said post portion being substantially normal to said plane, and attachment means for attaching said main body to a member to be secured to said track, and a latching plunger member slidably supported on said post portion for movement along the longitudinal axis of said post portion, said post portion and said plunger member including means for arresting the movement of said plunger along the longitudinal axis of said post portion in a first extreme upward position in which position the anchor assembly can be positioned along said track, and a second extreme downward position in which said anchor assembly is retained in said track with said plunger bottomed in one of the notches and said pad means positioned under predetermined flange portions thereof.

2. The assembly of claim 1 wherein said plunger member wraps around said post portion in mating engagement therewith.

3. The device of claim 1 and further including means for resiliently radially tensioning said plunger member against said post portion.

4. The device of claim 3 wherein said means for resiliently tensioning said plunger member against said post portion comprises a ball member, said post portion having a slot formed therein for retaining said ball member, and spring means retained in said slot for urging said ball member outwardly against the inner wall of said plunger member.

5. The device of claim 1 wherein said means for arresting the upward movement of said plunger member comprises a portion of the attachment means of said main body and said means for arresting the downward motion of said plunger member comprises a pin protruding from said post portion, said plunger member having an undercut portion which abuts against said pin to establish the extreme downward position of the plunger member.

6. The device of claim 1 wherein said means for arresting the upward and downward motion of said plunger member comprises a pin member protruding inwardly towards the center of said plunger member, said post portion having a slot formed therein in which the pin member rides, said extreme upward and downward positions being defined by the opposite ends of said slot.

7. The device of claim 1 and further including spring means for urging said plunger member towards the extreme downward position, said plunger member having a hollow central portion formed therein for receiving said spring means, said post portion having a ledge formed near the upper end thereof, and a pin retained in said plunger member and bridging the central portion near the bottom thereof, the spring being retained between said ledge and said pin.

8. The device of claim 1 wherein said plunger member has a slot formed therein and running therearound for facilitating the manual grasping thereof.

9. In an anchor assembly for attachment to a track member having a longitudinal slot and spaced notch portions separated by flange portions formed therein, said anchor assembly comprising:
a main body having a pair of flat surfaced pads lying in a plane defining the bottom portion thereof, a post portion located at an extremity of said main body and extending upwardly from the aforementioned plane, the longitudinal axis of said post portion being substantially normal to said plane, and attachment means for attaching said main body to a member to be secured to said track, and
a latching plunger member slidably supported on said post portion for movement along the longitudinal axis thereof, said plunger member being in the shape of a truncated hollow cylinder, the central portion of said cylinder being fitted over said post portion with the inner walls thereof wrapping around said post portion in mating engagement therewith,
said post portion and said plunger member including means for arresting the movement of said plunger along the longitudinal axis of said post portion in a first extreme upward position in which position the anchor assembly can be positioned along said track, and a second extreme downward position in which said anchor assembly is retained in said track with said plunger bottomed in one of the notches and said pad means positioned under predetermined flange portions thereof.

10. The device of claim 9 and further including means for resiliently radially tensioning said plunger member against said post portion.

11. The device of claim 10 wherein said means for tensioning said plunger member comprises a ball member, said post portion having a slot formed therein for retaining said ball member and spring means retained in said slot for urging said ball member outwardly against an inner wall of said plunger member.

12. The device of claim 11 wherein said means for arresting the upward movement of said plunger member comprises a portion of the attachment means of said main body and said means for arresting the downward motion of said plunger member comprises a pin protruding from said post portion, said plunger member having an undercut portion which abuts against said pin to establish the extreme downward position of the plunger member.

References Cited
UNITED STATES PATENTS

| | | | |
|---|---|---|---|
| 2,422,693 | 6/1947 | McArthur | 105—369A |
| 2,743,684 | 5/1956 | Elsner | 105—369A |
| 2,891,490 | 6/1959 | Elsner | 105—369A |
| 3,212,457 | 10/1965 | Looker | 105—369A |
| 3,241,501 | 3/1966 | Watts | 105—369A |
| 3,282,229 | 11/1966 | Elsner | 105—369A |
| 3,306,234 | 2/1967 | Hansen et al. | 105—369A |
| 3,334,718 | 8/1967 | Davidson | 105—369A |
| 3,344,749 | 10/1967 | Bass et al. | 105—369A |

DRAYTON E. HOFFMAN, Primary Examiner

U.S. Cl. X.R.

248—361A